Nov. 12, 1929.  M. HALSTED  1,735,500
PAN LIFTER
Filed Sept. 5, 1928
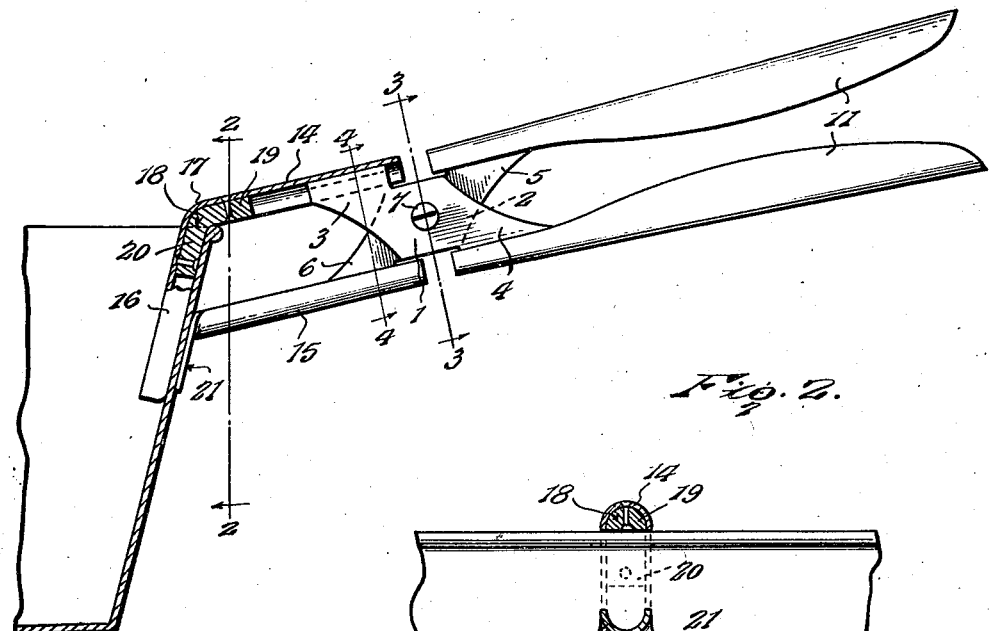
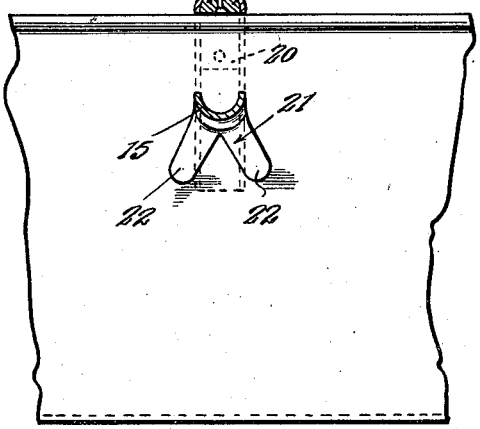
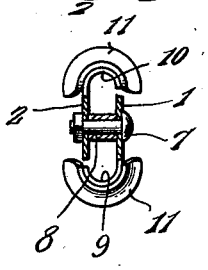
Inventor
M. Halsted.
By Lacey & Lacey, Attorneys Patented Nov. 12, 1929

1,735,500

UNITED STATES PATENT OFFICE

MARY HALSTED, OF ORMOND, FLORIDA

PAN LIFTER

Application filed September 5, 1928. Serial No. 303,995.

The present invention is directed to improvements in pan lifters.

The primary object of the invention is to provide a device of this character so constructed that a pan can be conveniently gripped and removed from a stove, or from an oven, without burning the hands.

Another object of the invention is to provide a device of this character so constructed that when the handles are moved toward each other the clamping jaws will operate to clamp the rim of the pan to firmly grip the same in order that it may be lifted without having the hands come in contact therewith.

Another object of the invention is to provide a device of this character which is exceedingly simple in construction, efficient in operation, durable, and one which can be manufactured at a very small cost.

With these and other objects in view, this invention resides in the novel features of construction, formation, combination and arrangement of parts to be hereinafter more fully described, claimed, and illustrated in the accompanying drawing, in which:

Figure 1 is a side view of the device, partly in section, showing the same in its operative position.

Figure 2 is a sectional view on line 2—2 of Figure 1.

Figure 3 is a sectional view on line 3—3 of Figure 1.

Figure 4 is a sectional view on line 4—4 of Figure 1.

The device comprises a pair of plates 1 and 2, the plate 1 having formed integral therewith diagonally disposed extensions 3 and 4, while the plate 2 is provided with similarly disposed extensions 5 and 6.

The plates 1 and 2 are pivotally connected by a bolt 7, there being a sleeve 8 interposed between the plates and engaged upon said bolt to maintain the plates in proper spaced relation.

The extensions 4 and 5 have carried thereby curved flanges 9 and 10 which are riveted or otherwise suitably secured to the handles 11, which are of channel formation to snugly receive the flanges 9 and 10 and to offer a comfortable grip.

The extensions 3 and 6 are also formed with similar flanges 12 and 13, respectively, the flange 12 being riveted to the shank 14 while the flange 13 is similarly connected to the shank 15. The shanks 14 and 15 are also of channel formation, the former having a downwardly and forwardly extending jaw 16 which is formed by angularly bending the shank 14, as at 17. The jaw 16 is formed integral with the shank 14 and is a continuation thereof. A reinforcing filler bar 18 is provided and consists of angularly disposed arms 19 and 20 which are riveted to the shank 14 and jaw 16, respectively, as more clearly shown in Figure 1 of the drawings. The shank 15 has its forward end provided with a jaw 21 which consists of a pair of divergingly arranged fingers 22—22, the latter jaw cooperating with the jaw 16 to clamp the pan, as shown in Figure 1. The handles 11—11 can be conveniently spread in order that the jaws 16 and 21 will spread to permit the jaws to be placed in position for gripping the pan when the handles are forced toward each other. Obviously, upon gripping the handles and holding the same firmly gripped, the jaws will tightly engage the pan to hold the same in order that it can be conveniently lifted. Also, when the handles 11—11 are moved away from each other, it will be seen that the jaws will release the pan.

The device, although primarily designed for lifting pans or the like, can be used successfully for holding fish to facilitate removal of hooks from the gills thereof.

From the foregoing, it is thought that the construction, operation, and many advantages of the herein described invention will be apparent to those skilled in the art, without further description, and it will be understood that various changes in size, shape, and proportion and minor details of construction may be resorted to without departing from the spirit or sacrificing any of the advantages of the invention.

What is claimed is:

1. A pan lifter comprising a pair of plates, a bolt pivotally connecting the plates, a sleeve engaged upon the bolt and interposed between the plates, said plates having front and rear extensions carried thereby, handles fixed to the rear extensions, and shanks secured to the front extensions, said shanks having jaws upon their forward ends.

2. A pan lifter comprising a pair of pivotally connected plates, handles connected to the plates, a shank connected to one of the plates and angularly bent to provide a jaw, a filler bar including a pair of angularly disposed arms for securement, respectively, to the jaw and shank, a second shank fixed to the other plate and having a jaw carried thereby and cooperating with the first named jaw to grip a pan.

In testimony whereof I affix my signature.

MARY HALSTED. [L. S.]